(No Model.)

O. F. GRANT.
FOUNTAIN PEN.

No. 397,123. Patented Feb. 5, 1889.

WITNESSES:
H. C. Evert
Albert B. Blackwood

Oscar F. Grant
INVENTOR
BY Connolly Bros
ATTORNEYS

UNITED STATES PATENT OFFICE.

OSCAR F. GRANT, OF PITTSBURG, PENNSYLVANIA.

FOUNTAIN-PEN.

SPECIFICATION forming part of Letters Patent No. 397,123, dated February 5, 1889.

Application filed July 2, 1888. Serial No. 278,790. (No model.)

*To all whom it may concern:*

Be it known that I, OSCAR F. GRANT, a citizen of the United States, residing at Pittsburg, in the county of Allegheny and State of Pennsylvania, have invented certain new and useful Improvements in Fountain-Pens; and I do hereby declare the following to be a full, clear, and exact description of the invention, reference being had to the accompanying drawings, which form part of this specification.

This invention has relation to fountain-pens and pen-holder attachments, and has for its object the provision of a fountain-pen of simple and inexpensive construction.

This invention has for its further object to provide an ordinary pen-holder with an attachment whereby a constant flow of ink will be produced for a certain length of time.

This invention has for its still further object to provide a pen-holder with a combined reservoir or ink-receptacle and finger-hold.

This invention has for its further object to provide means whereby ink may be readily injected into a fountain-pen reservoir and the flow of the same regulated.

This invention broadly consists in surrounding the lower part of a pen-holder and upper part of a pen-point with a piece of rubber or other flexible material of a peculiar shape and novel construction.

This invention further consists in attaching a rubber bulb to the upper end of a fountain-pen to carry the ink up through the center of the holder and a device to the lower end for regulating the flow of the ink.

This invention still further consists in the novel construction, combination, and arrangement of parts, more fully described hereinafter, and specifically pointed out in the claims.

Figure 1:
Figure 2:
Figure 3:

Referring to the accompanying drawings, Figure 1 is a side view of an ordinary pen-holder with my improvements attached. Fig. 2 is a sectional view in detail of the combined ink reservoir, regulator, and finger-hold. Fig. 3 is a modification showing the rubber bulb attached to the upper end of a fountain-pen and having my device for regulating the flow of ink attached to its lower end. This view is partly in section, showing the flanged top which gives bearing to the rubber bulb.

A represents the pen-holder; B, the finger-hold, having an enlargement, $b$, on its lower side constituting the ink-reservoir C represents the pen-point, and D the rubber bulb attached to the end of the holder.

I wish to call particular attention to the finger-hold, this being the means of regulating the flow of ink. I fill the ink-reservoir in the following manner: Compressing the ink-reservoir or finger-hold between the fingers and thumb, I dip the pen-point into the ink until the lower portion of finger-hold reaches the surface of the ink. The ink-reservoir is then allowed to expand automatically, and the air being exhausted from the reservoir the ink flows in and takes its place. The pen is then ready for use. I have found by actual practice that the ink will freely flow for an hour or more. This, however, greatly depends on the size of the reservoir and how the ink is allowed to flow. When the ink ceases to flow and the supply is exhausted, the operation can be repeated.

When through with using the pen, the bulb part or ink-reservoir of the finger-hold should be compressed and all the ink forced out. By so doing the gum will be preserved and the passage prevented from clogging and the pen kept in good condition.

It will be noticed that the finger-hold is much smaller at the lower end, where it surrounds the pen, than it is at the upper end, which embraces the pen-holder. This is so constructed in order to allow only a sufficient quantity of ink for use to flow. This can be easily regulated as follows: If desiring to produce a stronger flow of ink, the finger-hold is slid back some distance, where the pen-point is wider, and thus the opening becomes larger. Consequently more ink is allowed to flow. When found that there is a surplus flow of ink, the finger-piece is slid forward to diminish it. By this means of adjustment and regulation the desired quantity is fed to the pen-point.

When it is desirable to insert a new pen-point, the finger-hold is slid over the pen and off the holder. The new pen is then placed in the holder and the combined finger-hold and ink-regulator placed in its former position.

This pen is not intended to be used as a pocket-pen, but is particularly designed and adapted for office use.

Figure 4:
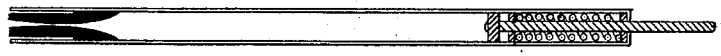

Having described my invention, I do not wish to limit myself to this specific construction, for the ink may be drawn into the elastic reservoir by means of a spring and piston, as shown in Fig. 4 of the drawings, without departing from the spirit of my invention.

Having fully described my invention, what I I claim, and desire to secure by Letters Patent, is—

1. A combined finger-hold and ink-reservoir adapted to be applied to an ordinary penholder and consisting of an elastic tube having a hole at one end for the reception of the lower end of a holder, an opening at the opposite end for the passage of the pen, and a bulbous intermediate body forming a reservoir, substantially as described.

2. A combined reservoir and finger-hold for pens, consisting of a tubular section of elastic material reduced at one end to closely embrace the pen, substantially as described.

In testimony that I claim the foregoing I have hereunto set my hand this 28th day of June, 1888.

OSCAR F. GRANT.

Witnesses:
H. C. EVERT,
LOUIS MOESER.